United States Patent [19]
Heikkinen et al.

[11] 4,083,394
[45] Apr. 11, 1978

[54] PORTABLE AUTOMOBILE RIM CRUSHER

[75] Inventors: Leo L. Heikkinen; Kenneth D. Danielson; Charlie L. Lundborg, all of Prentice, Wis.

[73] Assignee: LaFont Corporation, Prentice, Wis.

[21] Appl. No.: 748,664

[22] Filed: Dec. 8, 1976

Related U.S. Application Data

[63] Continuation-in-part of Ser. No. 661,714, Feb. 26, 1976, abandoned.

[51] Int. Cl.² .......................... B60C 25/12; B30B 7/04
[52] U.S. Cl. .................................. 157/1.21; 72/402; 100/232
[58] Field of Search ............... 100/232; 157/1.2, 1.21; 72/402

[56] References Cited
U.S. PATENT DOCUMENTS

| | | | |
|---|---|---|---|
| 2,730,166 | 1/1956 | Davidson et al. | 157/1.2 |
| 2,857,824 | 10/1958 | Fair | 100/232 X |
| 2,918,699 | 12/1959 | Hall | 100/232 X |
| 3,020,831 | 2/1962 | Barnes | 100/232 |
| 3,039,518 | 6/1962 | Neilsen | 157/1.21 |

Primary Examiner—James L. Jones, Jr.
Assistant Examiner—James G. Smith
Attorney, Agent, or Firm—Jacobson and Johnson

[57] ABSTRACT

An apparatus for removing the rubber tire casing from the steel rim of an automobile wheel which comprises a set of hydraulic cylinders and wedge shaped members which simultaneously converge on the tire casing and wheel to deform the tire rim into the figure of a three-leaf clover so that the tire rim can easily be removed from the inside of the casing. The wedge shaped member includes means for gripping a tire.

7 Claims, 2 Drawing Figures

PORTABLE AUTOMOBILE RIM CRUSHER

CROSS REFERENCE TO RELATED APPLICATIONS

This application is a continuation in part of my application filed Feb. 26, 1976, Ser. No. 661,714 now abandoned.

BACKGROUND OF THE INVENTION

1. Field of the Invention

This invention relates generally to scrap re-cycling means and more specifically, to a portable scrap re-cycling device for quickly and efficiently removing the steel rim from the tire casing.

2. Description of the Prior Art

The use of re-cycled automobile bodies and particularly automobile wheels has been practiced for some time. Each year there are 20 to 30 million automobile wheels that are relegated to the junk yard because the automobiles are no longer drivable or operable. In the past, the practice was to remove those which are good and sell them as used tires and those tires which were of no value were removed from the rims by burning. However, burning of rubber tire casings is an atrocious pollution producing process.

An alternative way to re-cycle the steel rim is to remove the tire from the rim by the conventional auto removal tools which usually is a time-consuming and costly process. This is undesirable because, in most instances, the tire is of little or no value.

Typical of some of the prior art devices employing three members are exemplified by the Fair U.S. Pat. No. 2,857,824; the Hall U.S. Pat. No. 2,918,699; the Barnes U.S. Pat. No. 3,020,831; the Neilsen U.S. Pat. No. 3,039,518 and the Davidson, et al U.S. Pat. No. 2,730,166. Briefly, the patent to Fair shows a machine for forming soil pipe around a mandril. The Hall patent shows the high pressure press with arms that converge. The Barnes patent shows an apparatus for applying circumferential pressure on a tire or the like. The Neilsen patent shows a tubeless tire bead seating apparatus. The Davidson patent shows a mobile trolley mounted tire removing machine in which mandrils break the bead away from the rim of the automobile.

All of these patents are typical of prior art patents using three or more devices in some operation. However, all of these types of prior art devices are for a manufacturing or repairing process. The purpose of the present invention is for separation of a tire casing from a wheel through destruction of the casing. The present invention comprises a solution to the problem of removing the tire casing from an automobile wheel rim through a process of compressing and deforming the wheel rim so that it will drop out of the tire casing.

SUMMARY OF THE INVENTION

Briefly, the present invention comprises a set of hydraulic cylinders and rams for deforming an automobile tire rim into the shape of a three-leaf clover by applying radial inward pressure, thus allowing the automobile tire rim to drop out of the tire casing.

DESCRIPTION OF THE PREFERRED EMBODIMENT

Figure 1:
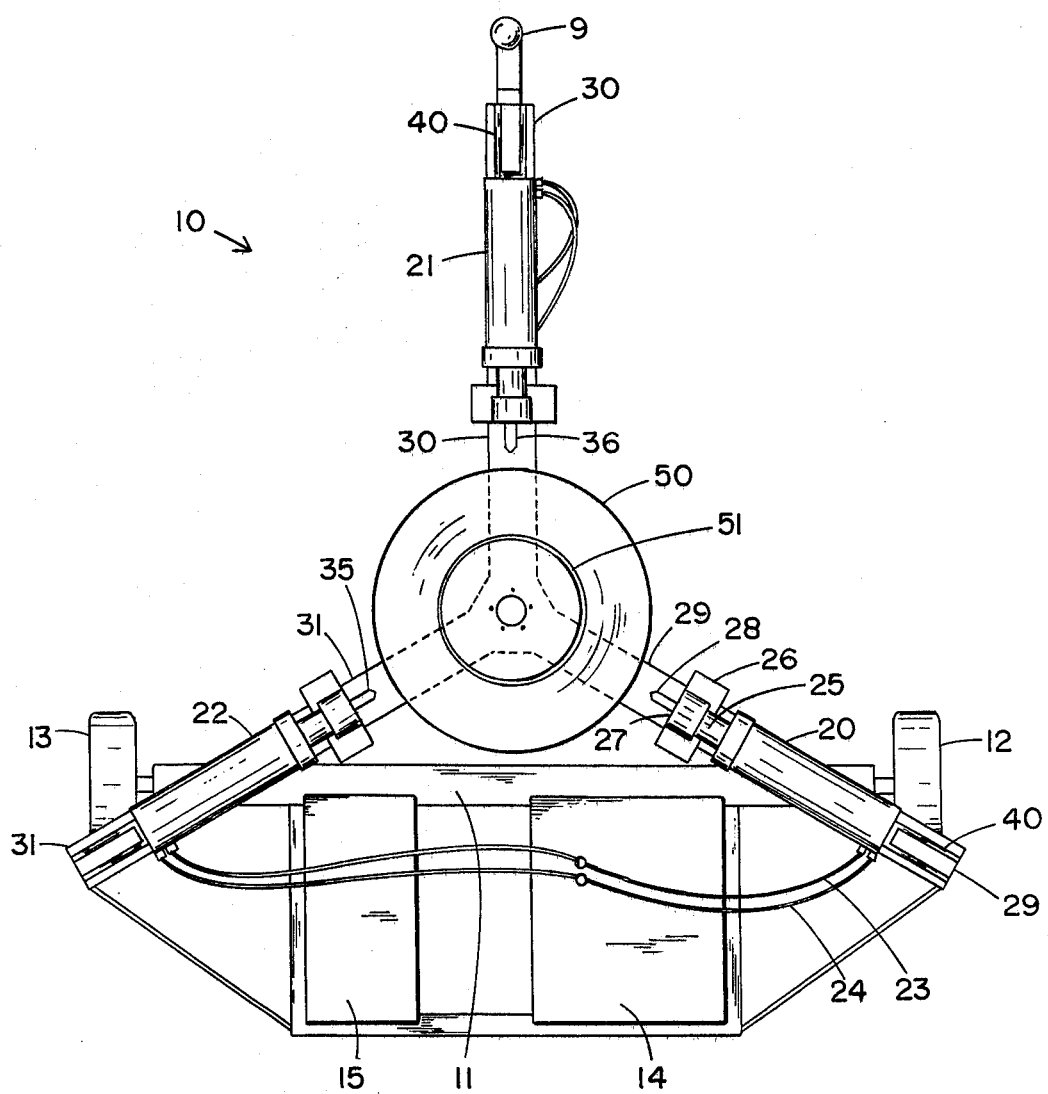
FIG. 1 is a top view of a portable automobile tire rim crusher.

Referring to the drawing, reference numeral 10 generally designates my portable automobile tire rim crusher. The automobile tire rim crusher is a trailer that comprises a main frame 11 having a wheel 12 on one side and a wheel 13 on the opposite side. A ball hitch 9 is connected to main frame 11 through arms 30, 31 and 29. Located on the rear portion of automobile tire rim crusher is a compartment 14 which contains an engine and hydraulic pump (not shown). Typically, the engine may be a gas engine with a hydraulic pump connected thereto. Located adjacent the engine pump housing 14 is an oil reservoir 15 for containing the oil used in the hydraulic rams. Both of these items are standard and well known and will not be described or shown herein.

Emanating from the engine and pump housing 14 are sets of hydraulic hoses which go to the three hydraulic cylinders 20, 21 and 22. As all three of the hydraulic cylinders are identical, only hydraulic cylinder 20 will be described herein.

A pair of hydraulic lines 23 and 24 supply hydraulic fluid under pressure to hydraulic cylinder 20 which is mounted firmly to the main frame 11 of trailer 10. An extendable arm 25 slides within the hydraulic cylinder 20. Located on the end of extendable arm 25 is a head 26 that slides along member 29, a face 27 and a wedge shaped elongated member 28. Wedge shaped member 28, while only shown in a top view is of sufficient width so as to have a width greater than the width of the tire 50 and rim 51.

As shown in the drawing, the tire 50 and rim 51 are placed in a central position between hydraulic cylinders 20, 21 and 22 which are located at 120° angles around tire 50 and rim 51.

In operation of my portable tire rim crusher, the operator begins by starting the engine located in engine housing 14. Next, a tire and rim are placed between the three hydraulic cylinders. The operator then activates the hydraulic pump located therein. The hydraulic pump simultaneously supplies hydraulic fluid to hydraulic cylinders 21, 22 and 20, thus forcing the wedge shaped members 28, 35 and 36 radially inward toward tire casing 50 and tire rim 51. The hydraulic cylinders continue to converge until members 35, 36 and 28 have physically deformed tire rim 51 into a cloverleaf shape.

Next, the operator releases the hydraulic pressure on the hydraulic cylinders and retracts members 28, 36 and 35. This allows the resilient tire casing to snap back if it has not been cut off by the wedge members. When the tire casing snaps back, it will be found that the tire rim 51 has been crushed into a three-leaf clover shape which has an outside diameter which is smaller than the inside diameter of the tire casing so that the tire casing can be quickly and easily removed from the tire rim.

Figure 2:
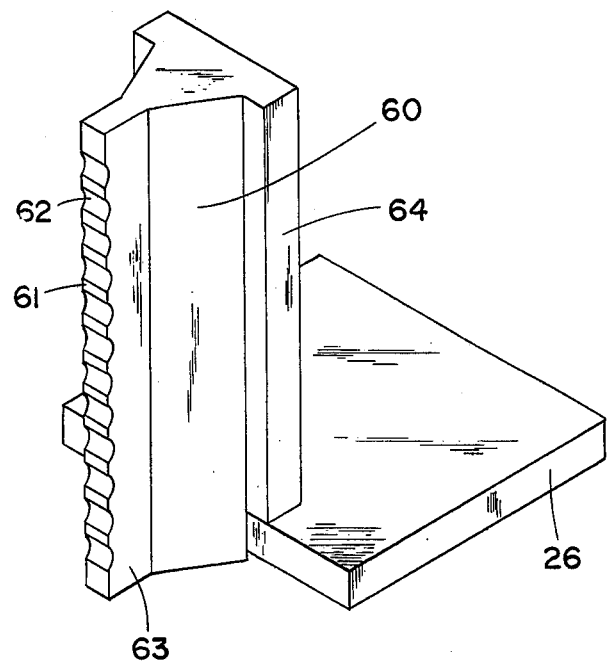
FIG. 2 is a detailed view of the member for holding the tire during the crushing process.

Referring to FIG. 2, reference numeral 26 designates the head which slides along member 29. Attached to head 26 is a wedge shaped member comprised of blade 63, side 60 and back support 64. Located on the edge of blade 63 is a set of serrations comprising flat portions 61 and curved portions 62. It has been discovered that the serrated surface prevents slipping between the tire and the wedge-shaped member even when the tire is wet. Thus, an operator can crush the rim under both dry and wet conditions.

From the above description of the present invention, it is apparent that the present invention almost instantaneously deforms the tire rim so that the tire casing can be lifted therefrom and thus allow the tire rim to be recycled as scrap metal.

Another feature of the invention is that the present invention is portable and thus can be towed from junk yard to junk yard. This feature, while unimportant to large junk yards is significant in rural areas where the ownership of equipment of this nature is generally too expensive for the small junk yard operator; however, a small junk yard operator can store his wheels and tires until it is practical to rent or hire someone to remove the tire casings from the wheels.

I claim:

1. An apparatus for removing a tire casing from a tire rim comprising:
   a frame for supporting a tire casing and a tire rim;
   a first power actuated member mounted on said frame, said power actuated member having a wedge-shaped elongated means for deforming said tire rim through said tire casing;
   a second power actuated member mounted on said frame, said power actuated member having a wedge-shaped elongated means for deforming said tire rim through said tire casing;
   a third power actuated member mounted on said frame, said third power actuated member having a wedge-shaped elongated means for deforming said tire rim through said tire casing;
   said first power actuated member, said second power actuated member and said third power actuated member coacting so that said wedge-shaped elongated means for deforming said tire rim on each of said power actuated members converge toward a central point to deform said tire rim located in a central position between said first power actuated member, said second power actuated member and said third power actuated member and thereby allow said tire casing to be removed from said rim.

2. The apparatus of claim 1 wherein said frame includes a set of wheels so that said apparatus can be moved from place to place and said wedge-shaped elongated means includes a serrated edge for engaging a tire casing.

3. The invention of claim 1 wherein said power actuated members comprise hydraulically operated cylinders.

4. The apparatus of claim 3 wherein said apparatus includes a portable power unit.

5. The apparatus of claim 1 wherein said wedge-shaped elongated means have a width which is greater than the width of the tire rim.

6. The apparatus of claim 1 wherein said power actuated members are located in the same plane and spaced at 120° angles with respect to one another.

7. The process of recycling a circular-shaped wheel having a circular-shaped tire casing thereon comprising the steps of:
   placing the wheel with a tire casing thereon on a support surface;
   directing deforming members radially inward over the support surface and against the tire casing until the circular-shaped wheel located in the tire casing has been deformed to a non-circular shape;
   retracting the deforming members to allow the tire casing to return to its normal circular shape; and
   separating the tire casing from the deformed wheel.

* * * * *